July 31, 1934.  P. S. HARPER  1,968,203
SHUTTER MEANS FOR GAS BURNERS
Filed June 13, 1930
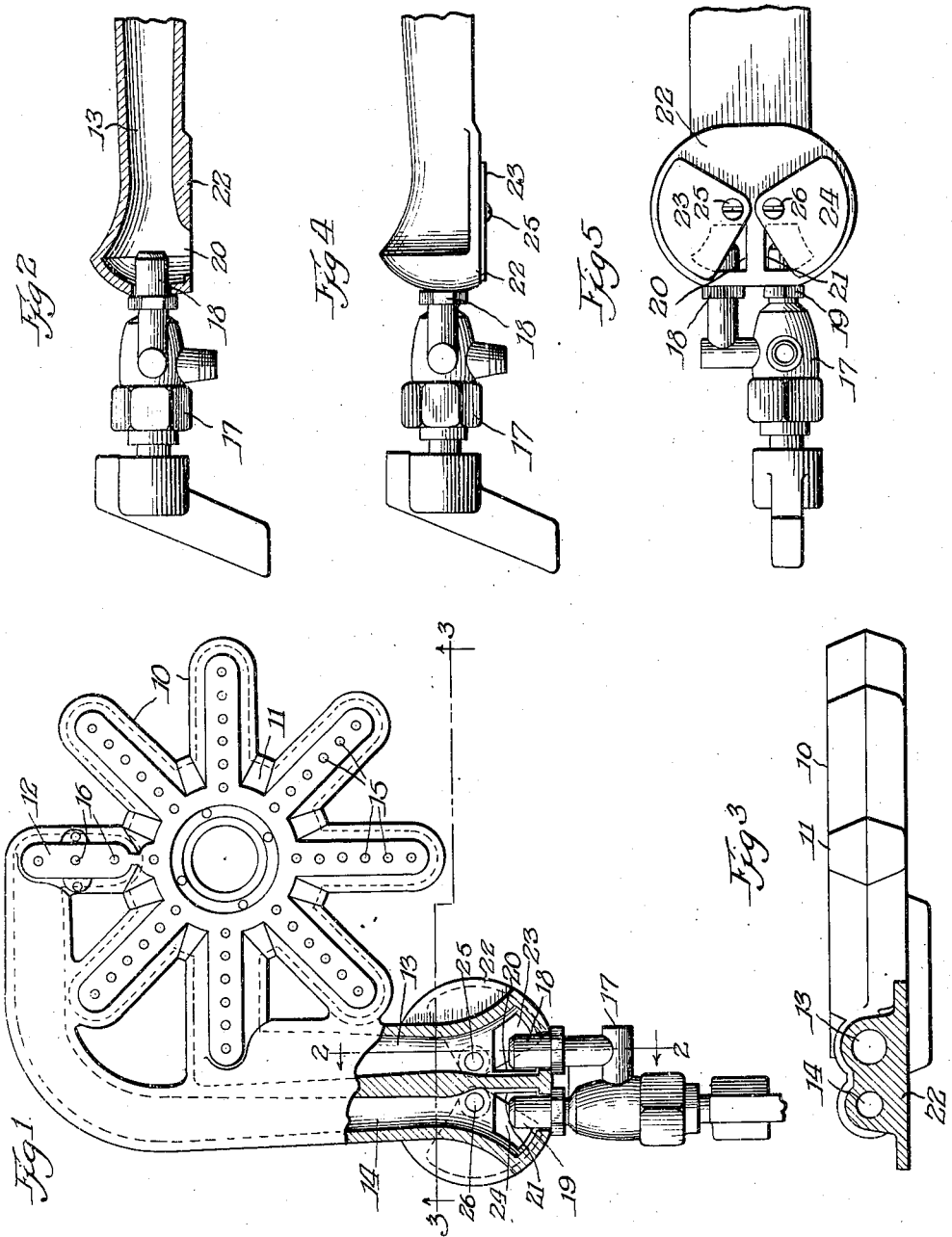

Patented July 31, 1934

1,968,203

UNITED STATES PATENT OFFICE 1,968,203

SHUTTER MEANS FOR GAS BURNERS

Philip S. Harper, Chicago, Ill.

Application June 13, 1930, Serial No. 460,827

3 Claims. (Cl. 158—118)

This invention relates to air shutters for a double burner as used on domestic gas ranges.

This invention consists of a double burner with two sections and two mixing tubes, the double burner having two separate shutters advantageously placed at the entrance to the said mixing tubes.

Heretofore shutters have been devised for double burners but these have all either been of a combination type as shown in my Patent No. 1,754,388, issued April 15, 1930, where an adjustment to the two sections is not independent, or they have been placed so as to be inaccessible and difficult to adjust with the gas flame ignited, while the shutters I have here devised are independent one from the other and are adjusted, in the preferred form of my invention, from below the burner so that there is no difficulty from the heat of the flame preventing accurate and careful adjustment with the burner in operation, and there is no need to remove semi-permanent parts of the stove to effect adjustment.

One object of this invention is to provide adjusting means for a double burner which are more accessible.

Another object of this invention is to provide practical independent air adjusting means for the two sections of a double burner.

Another object of this invention is to provide a simple and easily manufactured arrangement of parts for this device.

Another object of my invention is to provide a double burner with independent air adjustment to each section on a single mixer face.

These and other objects of this invention will be more apparent from the following description and the drawing, in which—

Figure 1 is a plan of a burner with shutters of the type of my invention, the mixing tube end being shown partially in section;

Figure 2 is a sectional elevation of the mixer end along line 2—2 of Figure 1, the shutters being removed;

Figure 3 is a sectional elevation along the line 3—3 of Figure 1, the shutters being removed;

Figure 4 is an elevation of the mixer end with the shutters in place; and

Figure 5 is a bottom view of the mixer end with the shutters in place.

Referring now to the drawing, a double burner 10 is shown having a large section 11 and a small section 12 (both shown by dotted lines). A large mixing tube 13 is incorporated connecting to section 11, and a smaller tube 14 connects to section 12. Both sections have burner ports 15 and 16 in the top thereof, arranged within the area of the usual cooking vessel. A gas cock 17 is shown having two nozzles 18 and 19 projecting respectively into the mixing tubes 13 and 14. The mixing tube 13 has an opening 20 for entrance of air, and mixing tube 14 has an opening 21 at its end for the same purpose. Both of these openings terminate in a flat mixer face 22 on which are fastened shutters 23 and 24 by means of the screws 25 and 26 which are tapped into the mixer face as shown. The shutters 23 and 24 are each preferably flat sheet metal stampings in the approximate form of a segment, and each having a hole therethrough for the fastening screws as shown. The screw 25, when loosened, serves as a pivot so that the shutter may be rotated so as to entirely cover the air opening 20, or may be rotated so as to leave said air opening entirely open, or may be placed in any intermediate position over the air opening all without interfering with the second shutter 24. When the proper position for this shutter 23 has been found for proper operation of the burner, it may be clamped and held permanently in this desired position by tightening the screw 25. The air shutter 24 may likewise be suitably adjusted and tightened by screw 26.

As can be seen, both shutters have their closing surface in a plane parallel to the burner ports, and so may be adjusted from below the flames in this form of my invention. The shutters also might be desirably placed on top of the mixing tubes and arranged to be adjusted from above, this being more advantageous than adjustment from the side or front, and this top adjustment type would constitute another form of my invention, though in most cases it would be less desirable than the form shown. It is also contemplated that the mixer faces need not be exactly parallel to the plane of the burner ports, it being obvious that they could be placed somewhat angularly to said plane and still provide major benefits realized from my invention.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A gas range burner having two sections and two mixing tubes, a single gas cock having two nozzles, one projecting into each of said mixing tubes, each of said mixing tubes connecting with a burner section, said burner sections being arranged within the area of the usual cooking vessel, each of said mixing tubes having an air opening thereto from a common mixer face, two adjustable shutters fastened to said mixer face, one shutter arranged to completely cover each of said air openings.

2. A double gas range burner having two mixing tubes, each of said tubes having an air port at its side, and rotatable shutters of substantially segmental shape arranged to cover said ports, said mixing tubes being separated one from the other throughout their entire length by wall means, said wall means being a single wall for at least a portion of the length of said tubes.

3. A gas range burner having two mixing tubes and two sections, a single gas cock having two nozzles, one projecting into each of said mixing tubes, an air opening into the side of each of said mixing tubes, two rotatable shutters each arranged to cover one of said openings, the axes of rotation of said two shutters being closer together than the axes of said two mixing tubes.

PHILIP S. HARPER.